United States Patent [19]
Albares

[11] 3,800,906
[45] Apr. 2, 1974

[54] LASER HETERODYNE ACOUSTIC SENSOR
[75] Inventor: Donald J. Albares, San Diego, Calif.
[73] Assignee: The United States of America as represented by the Secretary of the Navy, Washington, D.C.
[22] Filed: Aug. 22, 1972
[21] Appl. No.: 282,822

[52] U.S. Cl............ 181/.5 NP, 331/94.5 A, 73/71.1, 356/4
[51] Int. Cl............................................. G01c 3/08
[58] Field of Search................... 356/4; 331/94.5 A; 181/.5 NP; 250/199; 73/71.1, DIG. 1, 11

[56] References Cited
UNITED STATES PATENTS
3,326,078   6/1967   Clarke et al. ........................... 356/4
3,635,562   1/1972   Catherin .............................. 250/199
FOREIGN PATENTS OR APPLICATIONS
1,484,711   4/1966   France
OTHER PUBLICATIONS
Foster, "A Laser Device for Remote Vibration Measurement," 3/67, pg. 154–157, IEEE Trans. on Aerospace & Electronics Syst., Vol. AGS-3, No. 2

Primary Examiner—Maynard R. Wilbur
Assistant Examiner—N. Moskowitz
Attorney, Agent, or Firm—R. S. Sciascia; G. J. Rubens; J. W. McLaren

[57] ABSTRACT

First and second pairs of reflective elements including a single laser cell, define adjacent, parallel, resonant optical paths of different lengths through the same laser medium. One of the resonant optical paths is exposed to acoustic energy, changing its effective optical path length and the wavelength of the laser energy emitted by that path. Changes of the beat frequency between the two laser beams generated in the two resonant optical paths are detected and appropriately displayed as an indication of the intercepted acoustic energy.

6 Claims, 1 Drawing Figure

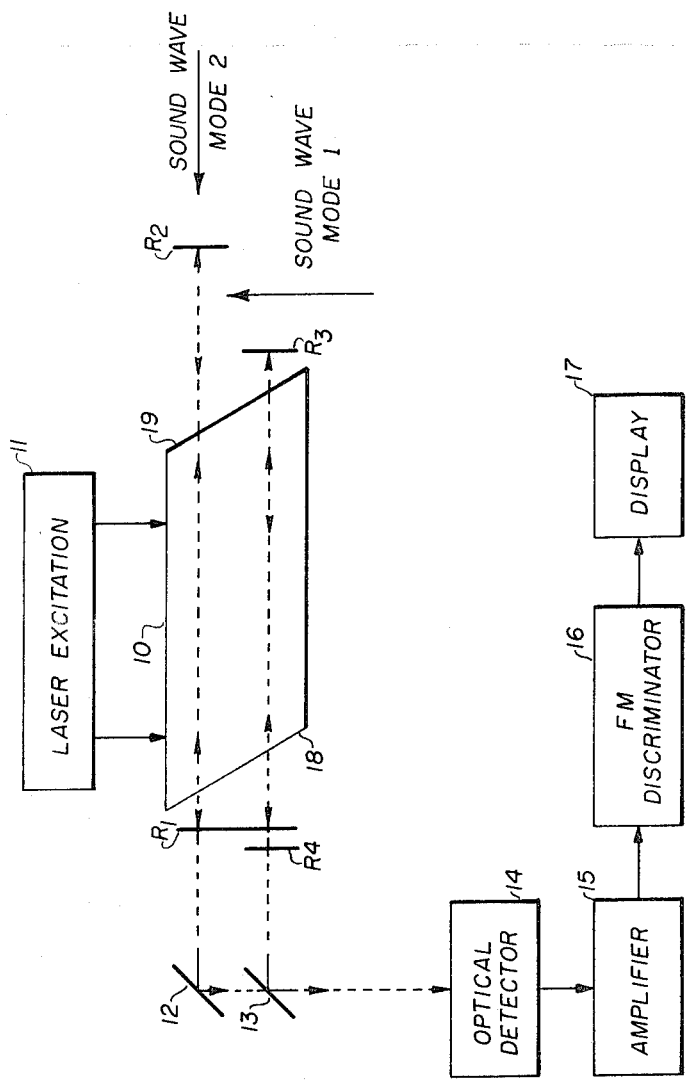

LASER HETERODYNE ACOUSTIC SENSOR

CROSS REFERENCE TO RELATED APPLICATION

The subject matter of pending U.S. Patent application, Ser. No. 145,978, filed May 21, 1971, in the name of Vern N. Smiley and titled "High-Sensitivity Laser Acoustic Detector" is generally related to that of the instant invention in the sense that laser phenomena are employed to detect acoustic energy. However, that application employs a single laser beam operating in a particular dual mode, whereas the present invention employs two separate laser beams operating in a particular manner as will be better appreciated from an understanding of the complete disclosure which follows hereinafter.

BACKGROUND OF THE INVENTION

Known prior art conventional acoustic sensors usually employed techniques which converted acoustic energy to electrical energy through the use of electromagnetic, piezoelectric, or magnetostrictive phenomena, for example. In the prior art it was known to use a membrane or equivalent element arranged to respond either to the pressure or to the particle velocity of acoustic energy in the form of a sound wave. Usually the motion or the force transmitted by the sound wave was converted by a suitable transducing element into an electrical signal which was, in turn, indicative of the acoustic energy.

Most such prior art devices, however, were undesirably subject to a variety of disadvantages, typical of which was the inability to accurately and reliably transduce weak acoustic signals. This particular disadvantage was aggravated by the presence of interferring unwanted acoustic noise signals which may occur in numerous forms, most of which are not generally susceptible to being readily and conveniently suppressed.

Accordingly, there is an existing requirement for a highly sensitive acoustic sensor system which is accurate, rapid, and reliable in performing its detection function, particularly as relates to weak acoustic signals in the presence of unwanted interferring acoustic noise.

The present invention has an extremely high sensitivity, accuracy, and reliability and, in addition may be employed in a selected one of several modes of operation to best meet the requisites of each particular application of its concept and teaching.

SUMMARY OF THE INVENTION

The present invention comprises a single laser cell containing a suitable laser material, such as a dye laser in solution, which is operated in conjunction with first and second pairs of reflective elements including the single laser cell therebetween and defining adjacent parallel resonant optical paths having different lengths.

When a source of suitable excitation laser energy is coupled to the single laser cell, such as by optical coupling in the case of a dye laser material, for example, laser emission is generated in two separate laser beams along resonant optical paths of different lengths.

One of the optical paths is exposed to the acoustic energy which it is desired to detect. Usually, the longer of the two resonant optical paths is selected to be exposed to the acoustic energy as a matter of convenience. The acoustic energy it is desired to detect is intercepted by the selected resonant optical path so as to cause a change in the effective optical length of that path. As a result there is a change in the wavelength of the laser energy emitted from that path without effecting or changing the wavelength of the laser energy emitted from the other resonant optical path.

Such change in the effective optical path upon which the acoustic energy impinges may be caused in one of several different ways embraced within the broadest aspects of the concept of the present invention. The several modes of operation will be explained more fully hereinafter.

However, regardless of the manner in which the change in effective optical path length is caused in the resonant optical path acted upon by the intercepted acoustic energy, there is a commensurate, measurable change in the beat frequency developed between the respective frequencies of laser energy generated in the first and second resonant optical paths. The changes in beat frequency are then detected by suitable frequency modulation detection techniques, which are well known in the electronic arts, and means for indicating the changes in that beat frequency between the two resonant optical path lengths are provided, such as an appropriate display, as a measure and indication of the acoustic energy which has impinged upon one of the two laser beams.

In the preferred embodiment of the present invention, the first and second pairs of reflective elements which define adjacent parallel resonant optical paths including the laser cell may have a common reflective element. That is to say that, a single mirror may be employed as a common reflective element defining one of the two limits or extreme dimensional extents in each of the two adjacent parallel resonant optical paths of different lengths.

In such an arrangement it is also preferable that such common reflective element by only partially reflective so that the laser beams generated by the first and second pairs of reflective elements may pass through the common reflective element for detection by a suitable optical detection means.

As will be appreciated by a more complete understanding of a specific embodiment of the present invention, such an arrangement affords desirable access to that portion of the laser beam which is generated in the longer of the two adjacent parallel resonant optical paths. In this way the acoustic energy of a sound wave, for example, may be intercepted transversely across the major axis of the longer of the two laser beams; alternatively, in another mode of operation, the acoustic energy may be intercepted parallel to the major axis of the beam by impinging orthogonally upon the plane of the second reflector of the longer of the two resonant optical paths.

In the first instance, the mode of operation of the present invention is such that sound waves change the refractive index of the medium through which they pass changing the effective optical length of the longer of the two resonant optical paths with a consequent and commensurate change in the wavelength of the laser energy emitted by the beam so intercepted. In the second mode described, the effective optical length of the longer of the two paths is altered by changes resulting from displacement of the second reflective element by reason of the force of sound waves directed against it thus changing the effective optical length of the path with a commensurate change in the wavelength of the laser emission developed by that path.

Accordingly it is a primary object of the present invention to provide an improved acoustic sensor of extremely high sensitivity.

An equally important object of the present invention is to provide such a high sensitivity acoustic detector which also possesses a high degree of reliability and accuracy.

Another most important object of the present invention is to provide a high sensitivity acoustic detector capable of operating to detect relatively very weak acoustic signals in an environment of a relatively high level of unwanted acoustic interference.

It is another most important object of the present invention to provide an acoustic detector which is capable of operation in either transparent or opaque media.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWING

The drawing is a schematic block diagram of a preferred embodiment of the present invention.

DESCRIPTION OF THE PREFERRED EMBODIMENT

In the drawing, a single laser cell 10 is positioned between a first pair of reflective elements R1 and R2 which defines a first resonant optical path; a second pair of reflective elements comprising R1 and R3 defines a second adjacent parallel resonant optical path. It should be noted that the element R1 is common to both of the adjacent parallel resonant optical paths in the preferred embodiment illustrated schematically in the block diagram of the FIGURE. However, the concept of the present invention is not so limited to the configuration wherein a single reflective element, such as $R_1$ is common to both of the parallel resonant optical paths. It is readily apparent that the resonant optical path between reflective elements $R_1$ and $R_2$ is of longer length than the resonant optical path between reflective elements $R_1$ and $R_3$. A source of laser excitation energy 11 is positioned adjacent the laser cell 10 for exciting the laser material within the laser cell 10 to a state of laser emission.

The laser cell 10 may preferably comprise a dye laser cell containing a suitable dye material in solution which is capable of being excited to a state of laser emission by appropriate optical coupling with the source of laser excitation 11. The high energy source of laser excitation 11 may take the form of an appropriate flash lamp, for example, selected for its high level of emission of energy within desired wavelength spectral regions.

One of the adjacent parallel resonant optical paths, such as that between reflective elements $R_1$ and $R_2$, as illustrated in the schematic block diagram of the drawing, is exposed to acoustic energy for causing changes in its effective optical path length in response to changes in the instantaneous amplitude of the acoustic energy. For example, acoustic energy in the form of a sound wave may be intercepted transversely across the major axis of the longer of the two laser beams, i.e., the beam which is generated between the reflective elements $R_1$ and $R_2$.

In that mode of operation, the sound waves operate to change the refractive index of the medium through which they pass thus changing the effective optical length of the longer of the two resonant optical paths with a consequent and commensurate change in the wavelength of the laser energy emitted by the beam so intercepted. It should be noted that the wavelength of the emission of the laser beam generated between reflective elements $R_1$ and $R_3$ will remain unchanged. Consequently, a change occurs in the beat frequency generated between the two parallel laser beams by reason of the change in the wavelength of the laser emission in one of those two beams. Such change in the beat frequency therefore is an indication and a measure of the acoustic energy which has been intercepted by the longer of the two resonant optical paths.

The two laser beam emissions developed between the respective parallel optical paths may be arranged to emerge from the common reflector $R_1$ by reason of that reflective element being only partially reflective. The two beams then may be appropriately deflected to a common path by reflective elements 12 and 13 disposed at a suitable angle relative to the major axis of each such laser beam.

Thus reflected to a single axis and a common path, the two laser beams may be detected in a suitable optical detector 14 which is responsive to the energy of the laser beams. The output of the optical detector, which is a typical transducing device changing the light energy to an electrical signal, is then amplified in a suitable amplifier 15.

The electrical signals representative of the two laser beams, after being thus amplified, may be fed as the input to a frequency discriminating circuit 16. The frequency discriminator 16 may be one of several types well known in the electronic arts for detecting frequency modulation or phase and modulation.

Changes in the beat frequency developed by reason of changes in the wavelength of the laser emission of one of the laser beams as a result of changes in the effective optical length of one of the two resonant optical paths, are thus detected in the FM discriminator 16. Such changes of beat frequency are an indication and a measure of the acoustic energy intercepted by one of the two resonant optical paths.

After being detected in the FM discriminator 16, the electrical signals representative of changes are connected to a display device such as a voltmeter, a cathode ray oscilloscope, or other suitable instrumentation for providing an indication and measurement of the acoustic energy impinging upon the longer of the two adjacent parallel resonant optical paths.

A second mode of operation conceived by the present invention similarly changes the effective optical length of the longer of the two optical paths by providing that the sound wave is received along the major axis of the optical path defined between reflective elements $R_1$ and $R_2$. As illustrated in the drawings, it will be appreciated readily by those skilled in the pertinent arts, that a sound wave received in the direction illustrated and indicated by Mode 2 will impinge orthogonally upon the principal plane of the reflective element $R_2$.

The acoustic energy displaces that plane of the reflective element $R_2$ along the major axis of the laser beam between reflective elements $R_1$ and $R_2$ by an amount which is a function of the acoustic energy brought to bear upon the reflective element $R_2$ in the form of a sound wave. Thus, the effective optical length of the optical path between reflective elements $R_1$ and $R_2$ changes in response to the change in acoustic energy impinging upon the reflective element $R_2$, causing a consequent change in the wavelength and frequency of the laser beam developed between the elements $R_1$ and $R_2$.

A resulting commensurate change is thus caused in the beat frequency between the respective frequencies developed between the two pairs of reflective elements $R_1$-$R_2$, and $R_1$-$R_3$.

As in the previously described first mode of operation, the two laser beams emerge finally from the laser cell and pass through the partially reflective common reflective element $R_1$ to be then deflected by appropriately disposed reflective elements 12 and 13, and then directed along a common path for detection in the optical detector 14.

After appropriate amplification in the amplifier 15, the electrical signals thus developed as a function of the laser emission generated between the adjacent parallel resonant optical paths are fed into a frequency discriminator type of circuit 16 wherein the beat frequency generated between the two laser beams includes changes which are indicative of and a measure of the acoustical energy impinging upon the reflective element $R_2$.

In a manner substantially the same as that previously described, changes in beat frequency detected in the frequency modulation discriminator type circuit 16 are then displayed on a suitable instrument such as a voltmeter, a cathode ray oscilloscope, or other appropriate display device. If desired, the output of the FM discriminator type circuit 16 may also be recorded for analysis, record retention, and comparison purposes as well as visually displayed.

It will be noted that the single laser cell 10 may include desirable, optional advantages such as Brewster windows 18 and 19 at its ends which function to minimize loss of laser energy by internal reflection.

Those skilled and knowledgable in the pertinent arts will also readily appreciate that the partially reflective element $R_1$ need not be common to both resonant optical paths but is shown as such in one particular configuration of the preferred embodiment. It will be apparent that $R_1$ and $R_2$ may comprise a pair of reflective elements defining a longer resonant optical path and a separate mirror $R_4$ may be employed in substitution of $R_1$ in the second and shorter optical path which is defined by the optical path between $R_4$ and $R_3$.

Additionally, it is not absolutely necessary that the longer of the two resonant optical paths be subjected to the acoustic energy of the sound wave but the shorter resonant optical path may be subjected to that acoustic energy as well.

Those skilled and knowledgeable in the pertinent arts will appreciate that because the present invention conceives the employment of a single laser used to develop two separate laser beams of different optical length, any change in ambient conditions will affect both beams in substantially the same manner. Thus, the reference beam may drift somewhat in its frequency of emitted laser energy but the other laser beam will drift in the same tendency so that that laser beam which is used for a reference is continually reliable for developing an indication of changes in frequency resulting from the interception of acoustic energy in the form of a sound wave by one of the two laser beams generated by the same laser cell.

Usually, the two resonant optical paths of different lengths will produce laser emissions of different wavelengths and the beat frequency therebetween will be the sum and/or the difference between the two different frequencies. Such operative conditions are not, however, necessary to the present invention. The two resonant optical paths of different lengths may produce laser emission of the same wavelength and in such case its beat frequency would be zero. However, when acoustic energy acts upon one of the resonant optical paths to change its effective optical length, a beat frequency will be developed and that frequency will be, in accordance with the concept and teaching of the present invention, a measure and indication of the received acoustic energy.

Additionally, the present invention has the advantage of avoiding the requirement of tuning the laser to a special and unique dual mode of operation producing two different frequencies from a configuration having a single, common axial alignment. The present invention does not require such special dual mode of generating two laser frequencies and therefore is greatly simplified in its operation as well as inherently possessing significantly enhanced reliability.

Obviously many modifications and variations of the present invention are possible in the light of the above teachings. It is therefore to be understood that within the scope of the appended claims the invention may be practiced otherwise than as specifically described.

What is claimed is:

1. A high sensitivity acoustic detector comprising:
   a single laser cell containing laser material;
   first and second pairs of reflective elements including said single laser cell therebetween and defining adjacent parallel resonant optical paths of different lengths traversing a common laser medium;
   a source of laser excitation energy disposed to energize said common laser medium for generating laser emission from said single laser cell, said laser emission being in two separate laser beams along said resonant optical paths of different lengths;
   means for exposing one of said resonant optical paths to acoustic energy for causing changes in its effective optical path length responsive to changes in the instantaneous amplitude of said acoustic energy;
   means for detecting changes of the beat frequency between said two laser beams; and
   means for indicating said changes of the beat frequency.

2. A high sensitivity acoustic detector as claimed in claim 1 wherein said first and second pairs of reflective surfaces have one reflective element in common.

3. A high sensitivity acoustic detector as claimed in claim 1 wherein each of said pairs of reflective elements includes a partially reflective surface.

4. A high sensitivity acoustic detector as claimed in claim 1 wherein the optical path exposed to acoustic energy receives said energy substantially transversely to the major axis of said optical path.

5. A high sensitivity acoustic detector as claimed in claim 1 wherein the optical path exposed to acoustic energy receives said energy substantially along the major axis of said optical path.

6. A high sensitivity acoustic detecor as claimed in claim 5 wherein said acoustic energy displaces a reflective element of one of said resonant optical paths.

* * * * *